M. A. BUCH.
BODY CONSTRUCTION.
APPLICATION FILED NOV. 15, 1915.
1,202,360.
Patented Oct. 24, 1916.
3 SHEETS—SHEET 1.
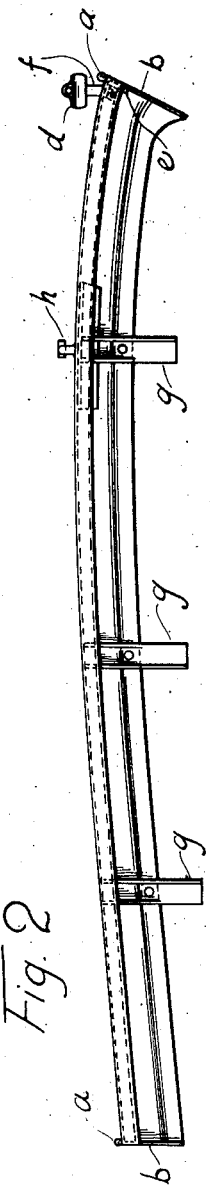
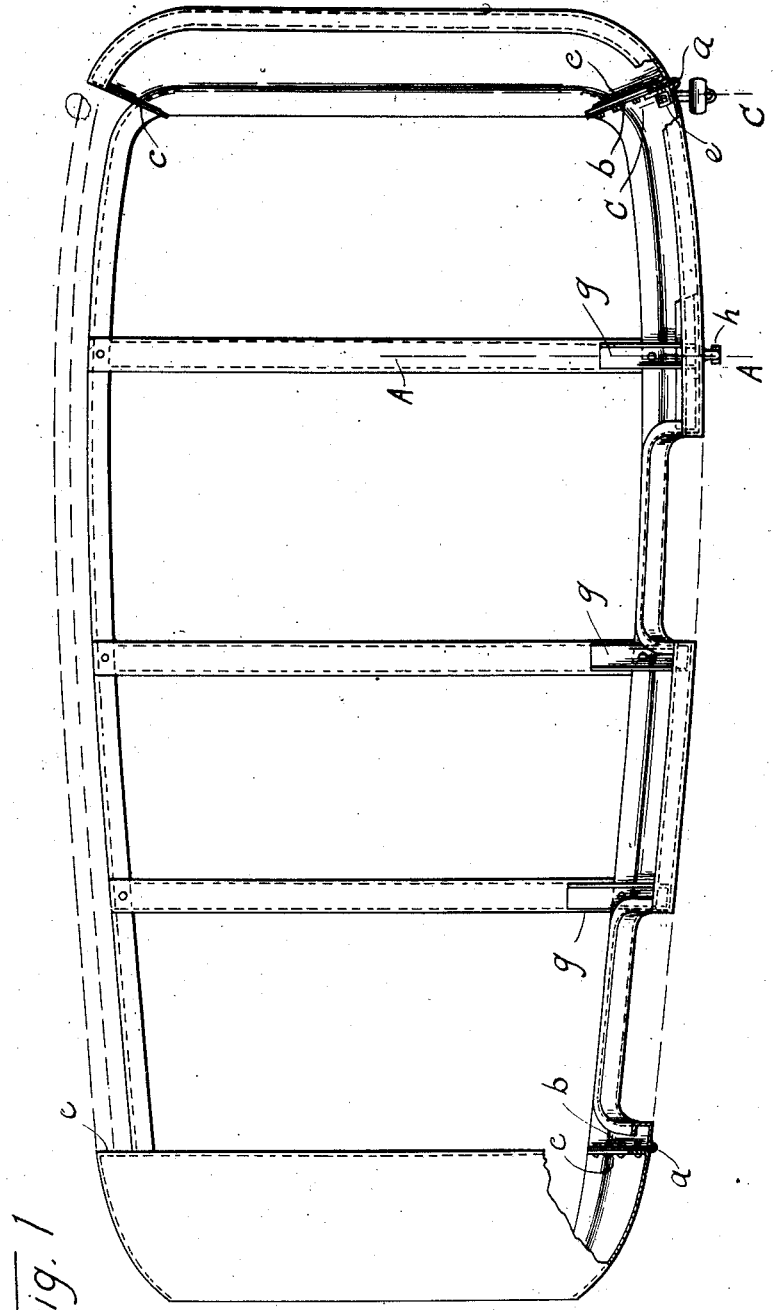
Fig. 2
Fig. 1
INVENTOR
Max A. Buch
BY Rahemond A. Parker
ATTORNEY M. A. BUCH.
BODY CONSTRUCTION.
APPLICATION FILED NOV. 15, 1915.
1,202,360.
Patented Oct. 24, 1916.
3 SHEETS—SHEET 2.
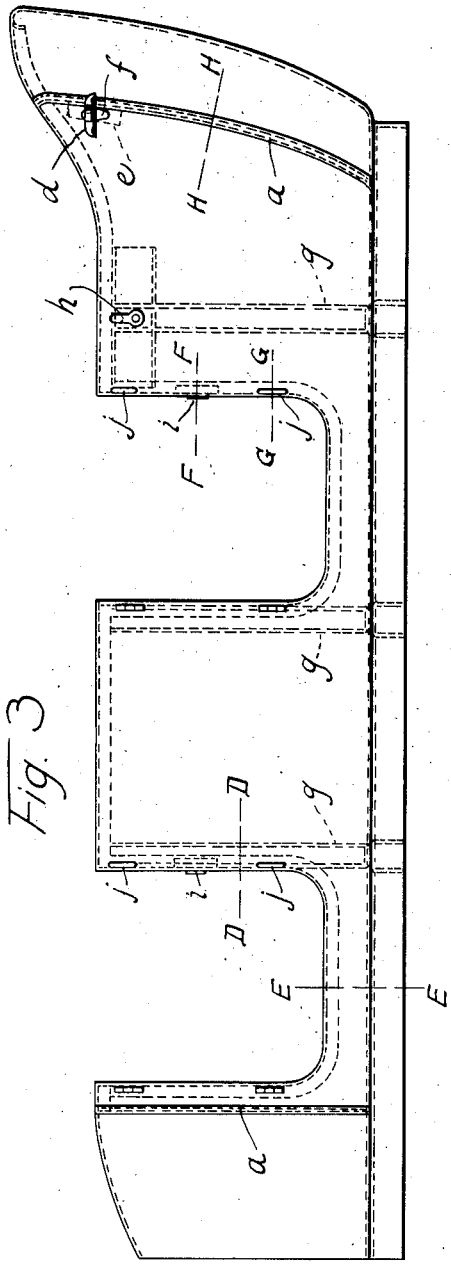
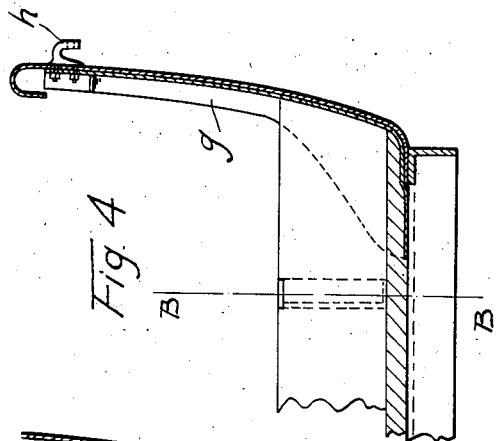
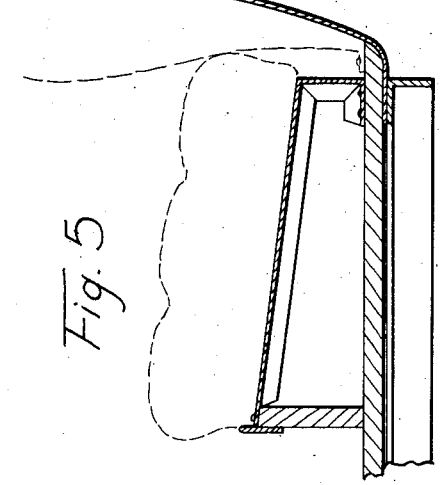
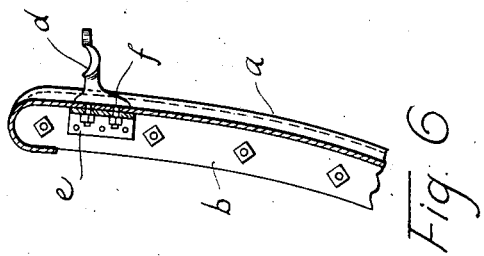
INVENTOR
Max A. Buch
BY Raymond A. Parker
ATTORNEY M. A. BUCH.
BODY CONSTRUCTION.
APPLICATION FILED NOV. 15, 1915.
1,202,360.
Patented Oct. 24, 1916.
3 SHEETS—SHEET 3.
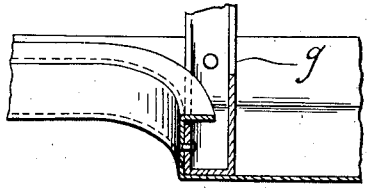
Fig. 7
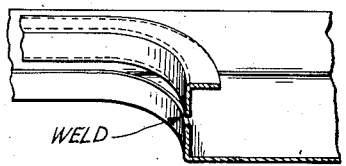
WELD
Fig. 8
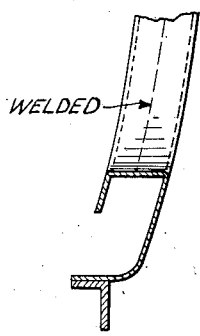
WELDED
Fig. 9

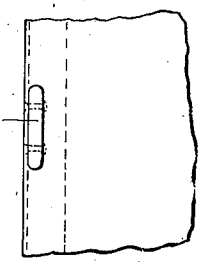
Fig. 11
Fig. 16
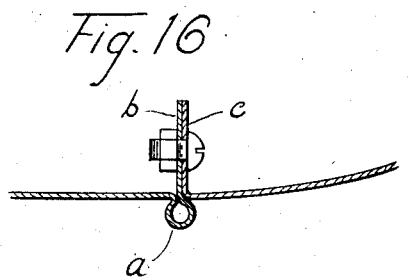
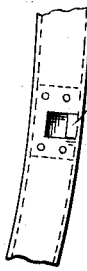
Fig. 14
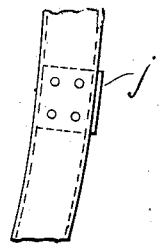
Fig. 12
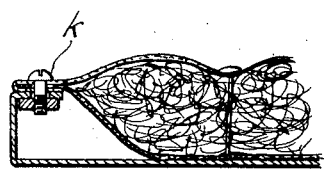
Fig. 15
INVENTOR
Max A. Buch
BY Ralzemond A. Parker
ATTORNEY

UNITED STATES PATENT OFFICE.

MAX A. BUCH, OF DETROIT, MICHIGAN.

BODY CONSTRUCTION.

1,202,360.  Specification of Letters Patent.  Patented Oct. 24, 1916.

Application filed November 15, 1915. Serial No. 61,491.

*To all whom it may concern:*

Be it known that I, MAX A. BUCH, a subject of the Emperor of Germany, residing at Detroit, county of Wayne, State of Michigan, have invented a certain new and useful Improvement in Body Construction, and declare the following to be a full, clear, and exact description of the same, such as will enable others skilled in the art to which it pertains to make and use the same, reference being had to the accompanying drawings, which form a part of this specification.

This invention relates to body construction, especially automobile bodies. It has a special reference to what is termed an all-metal body.

One of the features of this metal body construction is the way the door opening frames are built up.

Another feature is the joint made between adjacent panels.

Still another feature is the way the side panel structure is braced to the chassis frame.

Figure 10:
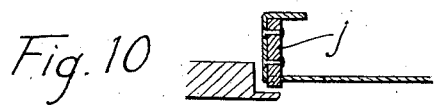
Figure 13:
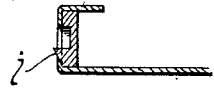

In the drawings,—Figure 1 is a plan view of the all-metal body, the left side panel being omitted. Fig. 2 shows the right side panel in position to be assembled in the body shown in Fig. 1. Fig. 3 is a side view of the all-metal body. Fig. 4 is a vertical section on the line A—A of Fig. 1. Fig. 5 is a vertical section on the line B—B of Fig. 4. Fig. 6 is a vertical section on the line C—C of Fig. 1. Fig. 7 is a horizontal section on the line D—D of Fig. 3. Fig. 8 is a similar section showing how the parts of the door opening frame are welded together. Fig. 9 is a vertical section on the line E—E of Fig. 3. Fig. 10 is a section on the line G—G of Fig. 3 showing one of the jamb blocks. Fig. 11 is a side elevation of a portion of the body showing in front elevation the jamb block. Fig. 12 is a fragment of the door opening frame, giving a side view of the jamb block. Fig. 13 is a horizontal section on the line F—F of Fig. 3. Fig. 14 is a view of a fragment of the door opening frame showing the latch striker and plate. Fig. 15 is a horizontal section of a portion of the body and the door opening frame showing how the upholstering is secured to my peculiar form of door opening frame. Fig. 16 is a section on the line H—H of Fig. 3 showing my new form of panel joint.

The all-metal body is made up of right and left hand side panels (Figs. 1 and 2), the left hand side panel being provided with two door openings while the right hand side panel (shown in Fig. 2) is shown as without door openings, the latter being a construction in some respects preferable, as it makes a stronger body. It closes the exits on the right hand side to avoid danger. The back panel (Fig. 1) is secured to the side panels by the joint detailed in Fig. 6 and Fig. 16. This comprises a bead $a$ formed on one panel at the corner where the metal turns in to form the flange $b$. The other panel has its edge merely turned in at a right angular corner to form a flange $c$. The flanges $b$ and $c$ are then bolted together as shown in Fig. 16, bringing the corner of the non-beaded panel under the bead of the beaded panel, thereby forming a tight joint well filled up so that no difficulty is experienced in enameling or japanning the body. The joint with the cowl can be made in the same way.

It will be noted that the rib formed by the in-turned flanges also serves as an aid in the support of the top iron rests $d$ (Fig. 6), the angle plate $e$ being riveted or bolted to the rib formed by the flanges $b$ and $c$ and the top iron itself being provided with integral bolt-like portions $f$ threaded on their ends for the reception of the nuts, by which the top irons are connected to the angle plates $e$ and hence to the rib formed by the flanges $b$ and $c$.

The side panels are secured and braced upon the chassis frame by means of the braces $g$ (see Figs. 1 and 2). A side view of one of these braces can be seen in Fig. 4. They comprise what is essentially a channel bar formed into a large angle iron. These braces, therefore, not only serve the purpose of securing the side panels to the chassis frame but they also serve as rigid supports for the side panels, and the rear pair of braces $g$ afford carriers for the top irons $h$ which receive the bow sockets or bows (Fig. 4).

The door opening frame is constructed in the following manner: The side panels are turned in for about half the width of the proposed door opening frame as shown in Fig. 8. A strip angular in cross section and curved to the curvature of the door opening is then welded to the turned-in edge by a butt weld. However, the exact width of the turned-in portion of the panel and the exact manner of welding is not material for it is obvious that the panel could be turned in farther and a lap weld made. This method of construction results in a door opening frame which is a homogeneous part of the side panel and which has a face at right angles to the plane of the side panel and has a turned-over flange which runs parallel to the plane of the side panels. It is obvious that such a construction would not be possible in ordinary die work or in hammering bodies out.

One very decided advantage of this form of construction is that the face of the door opening frame is smooth and unobstructed so as to form a very neat job and remove all obstructions which are liable to tear one's clothes. The only projection from the face of the door opening frame is a very slight lip $i$ (Fig. 13) which projects from the block to form the striker for the latch. This striking block is riveted to the inside of the door opening frame by countersunk rivets in exactly the same way that the jamb blocks $j$ (Figs. 10, 11 and 12) are riveted to the inside of the door opening frame. It will be noted that contrary to the usual construction, the jamb blocks project from the side of the body. Hence the edge zone of the side panels adjacent the door opening frame is in reality the jamb for the door rather than some device or devices projecting into the door opening as is customary. As already pointed out, this results in the decided advantage of having the door opening practically unobstructed to make a more sightly job and at the same time remove obstacles which catch clothing and interfere with ingress and egress.

The turned-in flange of the door opening frame plays an important part in supporting the upholstering which may be bolted thereto with the bolts and nuts $k$ so that it may very easily be removed when desired.

What I claim is:

1. In a vehicle body, the combination of a pair of panels, one of which is bent outwardly to form an outwardly projecting bead having an overhanging portion formed by turning the metal back upon itself and then bending the same inwardly to form a substantially perpendicular flange for the panel, and the other panel being bent inwardly and substantially perpendicularly to the main portion of the panel to form a corner adapted to fit on the overhanging portion of the bead of the first-mentioned panel, and means for drawing and holding the two flanges tightly together.

2. In a vehicle body, the combination of a side panel, a metal door opening frame secured to the side panel to form an angle therewith, one or more metal jamb blocks, and fastening devices passing through the sides of the jamb blocks and the metal door opening frame for securing the jamb blocks, said jamb blocks projecting through the sides of the panel so as to make the edge zone of the side panel adjacent the door opening the jamb.

In testimony whereof, I sign this specification.

MAX A. BUCH.